(12) United States Patent
Stutts

(10) Patent No.: US 6,789,787 B2
(45) Date of Patent: Sep. 14, 2004

(54) PORTABLE, EVAPORATIVE COOLING UNIT HAVING A SELF-CONTAINED WATER SUPPLY

(76) Inventor: Tommy Stutts, 1601 N. Palestine, Athens, TX (US) 75751

( * ) Notice: Subject to any disclaimer, the term of this patent is extended or adjusted under 35 U.S.C. 154(b) by 6 days.

(21) Appl. No.: 10/310,424

(22) Filed: Dec. 5, 2002

(65) Prior Publication Data

US 2003/0111746 A1 Jun. 19, 2003

Related U.S. Application Data

(60) Provisional application No. 60/343,532, filed on Dec. 13, 2001.

(51) Int. Cl.[7] .................................................. B01F 3/04
(52) U.S. Cl. .............................. 261/28; 261/58; 261/67; 261/72.1; 261/90; 261/DIG. 43
(58) Field of Search ........................... 261/28, 30, 34.1, 261/58, 66, 67, 72.1, 89, 90, DIG. 3, DIG. 43

(56) References Cited

U.S. PATENT DOCUMENTS

| | | | |
|---|---|---|---|
| 2,079,117 A | * | 5/1937 | Hays ........................... 261/30 |
| 2,238,120 A | | 4/1941 | Launder |
| 5,447,663 A | * | 9/1995 | Dix et al. ..................... 261/70 |
| 5,956,964 A | * | 9/1999 | Wright ........................ 62/304 |
| 6,086,053 A | | 7/2000 | Natschke et al. ............. 261/30 |
| 6,182,463 B1 | | 2/2001 | Strussion et al. ............. 62/314 |
| 6,237,896 B1 | | 5/2001 | Hicks et al. .................. 261/28 |
| 6,325,362 B1 | * | 12/2001 | Massey et al. .............. 261/127 |

FOREIGN PATENT DOCUMENTS

WO        WO00/69569        11/2000

OTHER PUBLICATIONS

F.I.T. Ventilation Brochure Clearwater FL.
Texas Cooling Systems Brochure San Antonio TX.
Thermal Dyn Brochure (Versa Mist®) www.thermaldyn.com.

* cited by examiner

Primary Examiner—Scott Bushey
(74) Attorney, Agent, or Firm—Drude Faulconer

(57) ABSTRACT

A portable cooling unit (i.e. a mister) having a portable frame on which a fan and a water tank is mounted. A pump is mounted on the frame for pumping water from the tank to nozzles in a mister head which, in turn, is mounted on the front of the fan. Both the direction and the flow through the nozzles are adjustable.

13 Claims, 6 Drawing Sheets

PORTABLE, EVAPORATIVE COOLING UNIT HAVING A SELF-CONTAINED WATER SUPPLY

CROSS-REFERENCE TO EARLIER APPLICATION

The present application claims the priority of U.S. Provisional Application No. 60/343,532, filed Dec. 13, 2001.

DESCRIPTION

1. Technical Field

The present invention relates to a portable, evaporative cooling unit for producing a cooling spray of water and in one of its aspects relates to a portable cooling unit commonly known as a "mister" having a self-contained water supply as an integral part of the unit.

2. Background of the Invention

Evaporative cooling devices, i.e. "misters", are well known and are routinely used in a variety of different environments (e.g. sidelines of athletic events, sidewalks and outdoor cafes, indoor and outdoor work areas, etc.) where refrigerated air-conditioning is not feasible or additional cooling is needed. The benefits of such coolers are appreciated by anyone who has ever experienced their use on a hot day.

Misters, in general, are comprised of the same basic components; i.e. (a) an air mover (hereinafter collectively referred to as a "fan"), (b) a nozzle or nozzles positioned in front of the fan; and (c) a pump for pumping water to the nozzles. The nozzles then spray the water into the airflow from the fan which, in turn, distributes a fine mist in the area around the front of the fan. As the mist evaporates, it produces a cooling effect for those within this area.

While portable misters of this type have been known for some time, an annoying problem still exists in supplying the water required for operation. Routinely, the water is supplied through a common garden hose or the like from a central water source (i.e. a city utility water system). While this works well, the hose connections invariably leak which, in turn, quickly produce puddles of water near and around the mister.

As will be recognized by anyone who has experienced such a situation during an outdoor athletic contest or the like, these puddles quickly become mud holes which, in turn, are messy and annoying to the users and can distract from the benefits of the misters. Further, in some environments, a central water supply is unavailable or is otherwise inaccessible or an excessive length of hose is needed to make the necessary connection.

To overcome these problems, there have been a few portable misters that are designed to use a dedicated water source. One such commercially available mister (e.g. VersaMist®) is comprised of fan-pump unit is set on a commercially available "water cooler" (e.g. 10 gallon, IGLOO® Cooler).

Another portable mister is supplied water from a tank which is mounted on a completely separate carriage from that on which the portable mister, itself, is mounted, and is connected to the mister by a hose; see U.S. Pat. No. 6,237,896 B1, issued May 29, 2001. While providing a dedicated water supply, these water sources still have to be handled separately when moving and repositioning the mister. This can require a "second set of hands" which, in turn, can be both inconvenient and cumbersome in storing and operating these misters.

Accordingly, a need exists for a readily portable, self-contained mister unit that includes its own water supply as an integral part of the portable unit. This allows the unit to be easily be transported by a single operator and one which can stored as a single unit without the need to disassemble and handle the water supply separately.

SUMMARY OF THE INVENTION

The present invention provides a portable mister unit, which is, includes its own dedicated water supply as an integral part of the unit. This allows the mister, including its water supply, to be easily moved as a unit by a single operator without having to make connections to a separate water source.

More specifically, the present invention provides a portable mister unit that is comprised of a "dolly-like" frame which, in turn, is comprised of a horizontal platform and a vertical support extending upward therefrom. Wheels are mounted on the frame to make the unit portable and easily movable from place to place. An electrically-driven fan is mounted on the vertical support and has a mister head mounted on the front thereof.

The mister head, in turn, is comprised of conduits that are assembled in an H-shaped configuration. A spray nozzle assembly is connected to each end of a respective conduit. Each nozzle assembly includes a ball-joint connection that allows the nozzle to be positioned in different directions to maximize the cooling effects from a particular application and a valve for adjusting the flow through the nozzle.

In accordance with an important aspect of the present invention, a tank is mounted on the horizontal platform of the frame for providing a self-contained water supply for the portable mister unit. An electrically-driven pump is mounted on the tank for pumping water from the tank to the nozzles in the mister head. By mounting the tank on the same frame with the fan and mister head, the entire mister is completely portable as a unit and does not require the water source to be handled separately.

In a further embodiment, the vertical support on the frame is comprised of a first section and a second section, which are hinged together. A fan having the mister head thereon is mounted on the second section of the vertical support while the water tank and pump are mounted on the first section of the same frame. When in an operable position, the sections are secured in an extended, upright position by braces or the like. When the unit is to be transported and/or stored, the braces are unbolted and the second section is folded down onto the first section.

BRIEF DESCRIPTION OF THE DRAWINGS

The actual construction operation, and apparent advantages of the present invention will be better understood by referring to the drawings, not necessarily to scale, in which like numerals identify like parts and in which.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DESCRIPTION OF THE PREFERRED EMBODIMENTS

Figure 1:
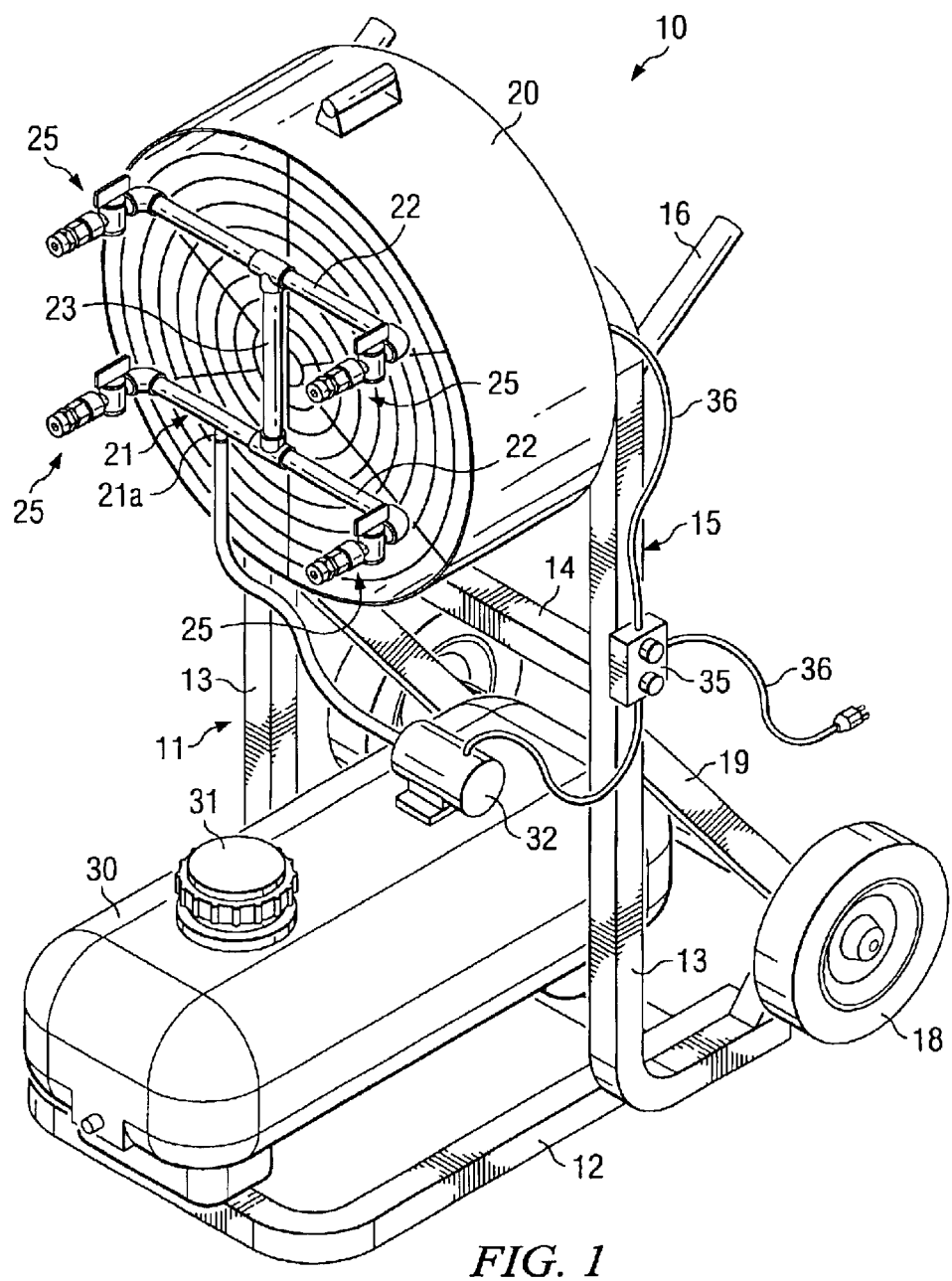
FIG. 1 is a perspective, front view of the mister, evaporative cooling unit of the present invention.
Figure 2:
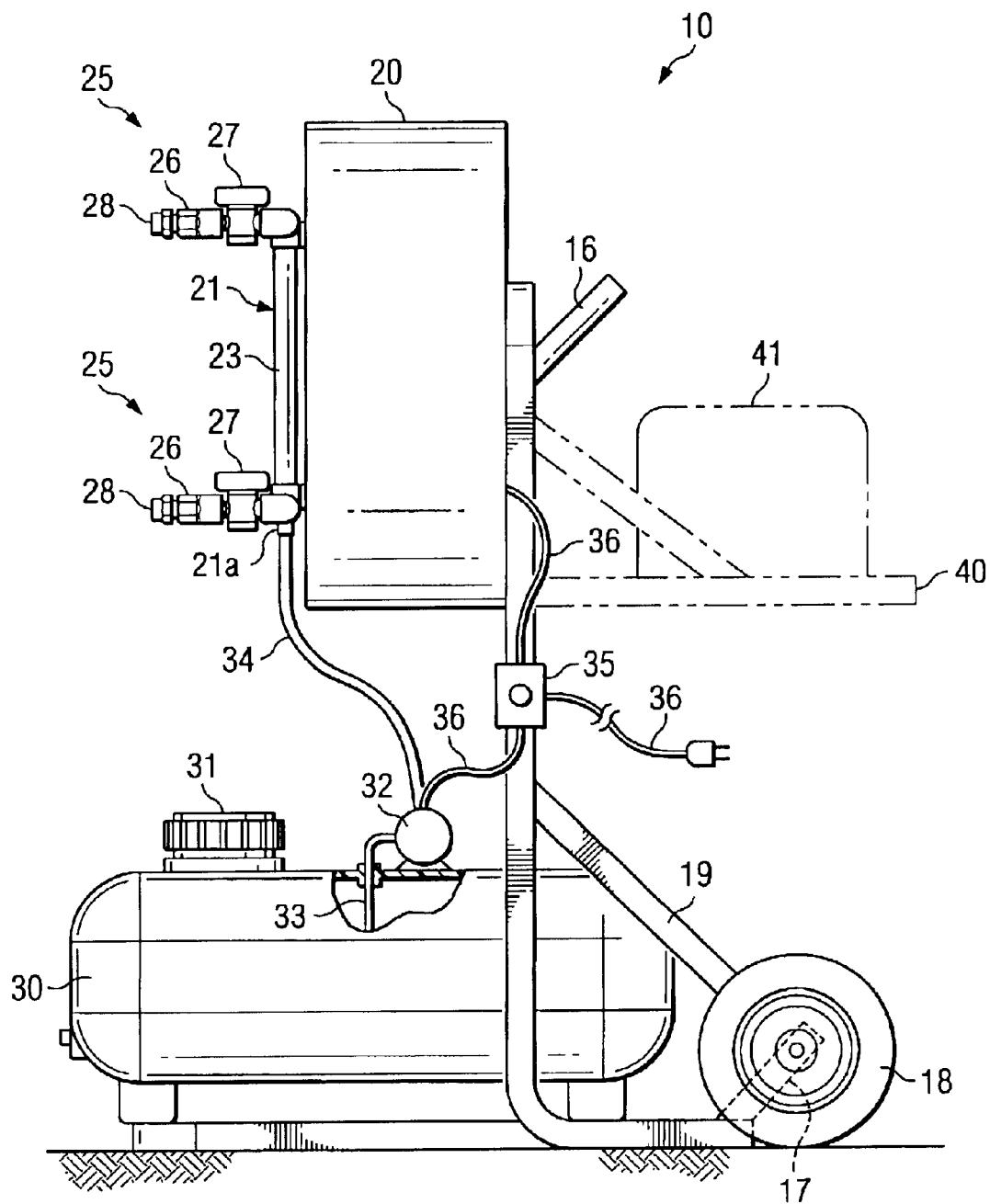
FIG. 2 is a side view of the cooling unit of FIG. 1.

Referring more particularly to the drawings, FIGS. 1 and 2 illustrate a portable, evaporative cooling unit 10 (hereinafter referred to as a "mister") in accordance with the present invention. Mister 10 is comprised of a "dolly-like" frame 11 which in turn, is comprised of a horizontal platform 12 and a pair of vertical members 13 which, with cross braces 14 (only one visible) form a vertical support 15. Handles 16 (only one shown) are secured to respective vertical members 13 (i.e. one on each member 13) to aid in moving unit 10.

A wheel mount (dotted lines 17, FIG. 2) is welded or otherwise secured to either side of the rear of the platform 12 and a wheel 18 is journaled thereto. The mounts 17 are angled upward with respect to platform 12 whereby each wheel is substantially level with the ground when unit 10 is in its upright or operable position. The angled wheel mounts 17 allow frame 11 to tilted backward up onto the wheels for easy movement of the unit 10 from one location to another. A reinforcing brace(s) 19 is provided for each wheel mount to strengthen same.

Figure 3:
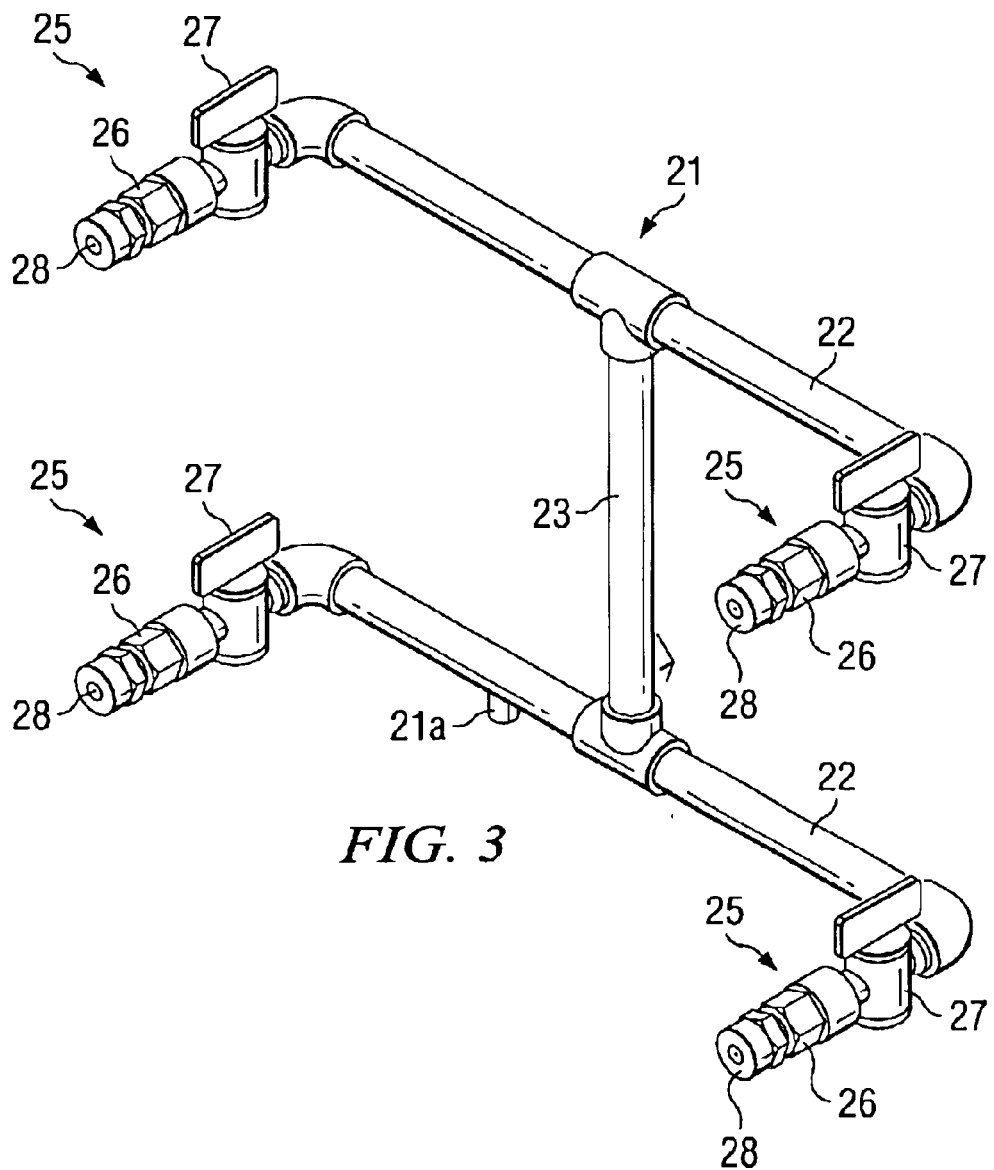
FIG. 3 is an, enlarged perspective view of the mister head of the cooling unit of FIG. 1.

Mounted to the front and near the upper end of vertical support 15 is an electrically-driven fan 20 of a desired size; (e.g. 24 inch, HartCool™, Hartzell Fan Co., St. Cloud, Minn.). Mister head 21 is attached to the front of fan 20 so that flow from the mister head will be directed into the airflow from the fan. Mister head 21, as best seen in FIG. 3, is basically formed of a "H-shaped" configuration, laid on its side, and is comprised of two elongated conduits 22 joined by a cross conduit 23 of the same material (e.g. PVC tubing). All of the conduits are in fluid communication with each other so that flow is continuous therethrough.

Mounted on each end of each of the elongated conduits 22 is a spray nozzle assembly 25. Each assembly 25 (FIGS. 2 and 3) is comprised of a ball-joint connector 26 for pivotably connecting nozzle 28 to its respective end of a conduit 22. This mounting arrangement allows each of the nozzles to be independently adjusted to thereby direct the spray from a particular nozzle 28 in a direction in respect to the air flow to achieve maximum, desired result in a particular cooling application.

Also included in each spray nozzle assembly 25 is a valve 27 which, as shown, is positioned between the ball-joint connector 26 and a spray nozzle 28. Valve 27 controls the flow through each nozzle for adjusting the amount of cooling desired. The ball-joint connector 26, valve 27, and nozzle 28 are all commercially available (e.g. Loc-Line T valves and nozzle, distributed by Lockwood Products, Lake Oswego, Oreg.).

In accordance with an important feature of the present invention, a storage tank 30 (e.g. 15 gallon, light weight molded plastic) is mounted on horizontal platform 12 thereby making portable unit 10 self-contained as to its water supply. This is important since most misters of this type use either a separate portable water source or use "garden hose" connected to a common utility water source to supply the necessary water for the mister head. Accordingly, leakage almost always occurs which; in turn, forms messy "puddles" of water around the mister, which are irritating and unpleasant to the users. Also, extremely long lengths of hose are often needed to connect the prior art misters to the common supply that further makes of such misters difficult and less desirable to use.

Tank 30 is filled through screw-capped opening 31 and has an electrically-powered pump 32 (e.g. FLOJET PUMP, ITT Industries, Foothills, Calif.) mounted thereon. The inlet or suction 33 of pump 32 is in fluid communication with the interior of tank and the outlet of the pump is connected to the inlet 21a of mister head 21 via tubing 34 or the like. Preferably, both the electrically-powered fan 20 and the electrically-powered pump 32 are plugged into a common AC source, e.g. electric utility company. Both the fan and the pump can be wired with standard electrical cable 36 and both can be controlled through a single switch 35. Of course, separate switches can be used, if desired.

In locations where a common source of electricity is not available, a shelf or the like (dotted lines 40 in FIG. 2) can be attached to the back of vertical support 15 by welding or the like. Batteries or preferably, a gasoline-powered generator (dotted lines 41 in FIG. 2) can be mounted onto shelf 40 to supply the required electrical power for unit 10.

In operation, tank 30 is filled with water and unit 10 is easily wheeled into position and is plugged into an electrical outlet or, alternately, power can be supplied from a self-contained source, e.g. batteries or generator 41. Switch 35 is turned on and water is pumped by pump 32 from tank 30 into the inlet 21a (FIG. 3) of mister head 21 through tubing 34. The water flows through conduits 22, 23 and out through the respective nozzle 28 in each spray nozzle assembly 25. Each nozzle can be independently positioned about its ball-joint connector 26 to direct the spray from that nozzle in a desired direction. Further, if a lesser amount of cooling is desired in a particular situation, one or more of the valves 27 can be closed partially or completely to control and adjust the ultimate flow and direction of the spray from unit 10. As will be understood, as the water is sprayed from nozzles 28 into the airflow of fan 20, the spray is carried as a cloud of moisture that quickly evaporates to cool a person/animal positioned in front of the fan.

Figure 4:
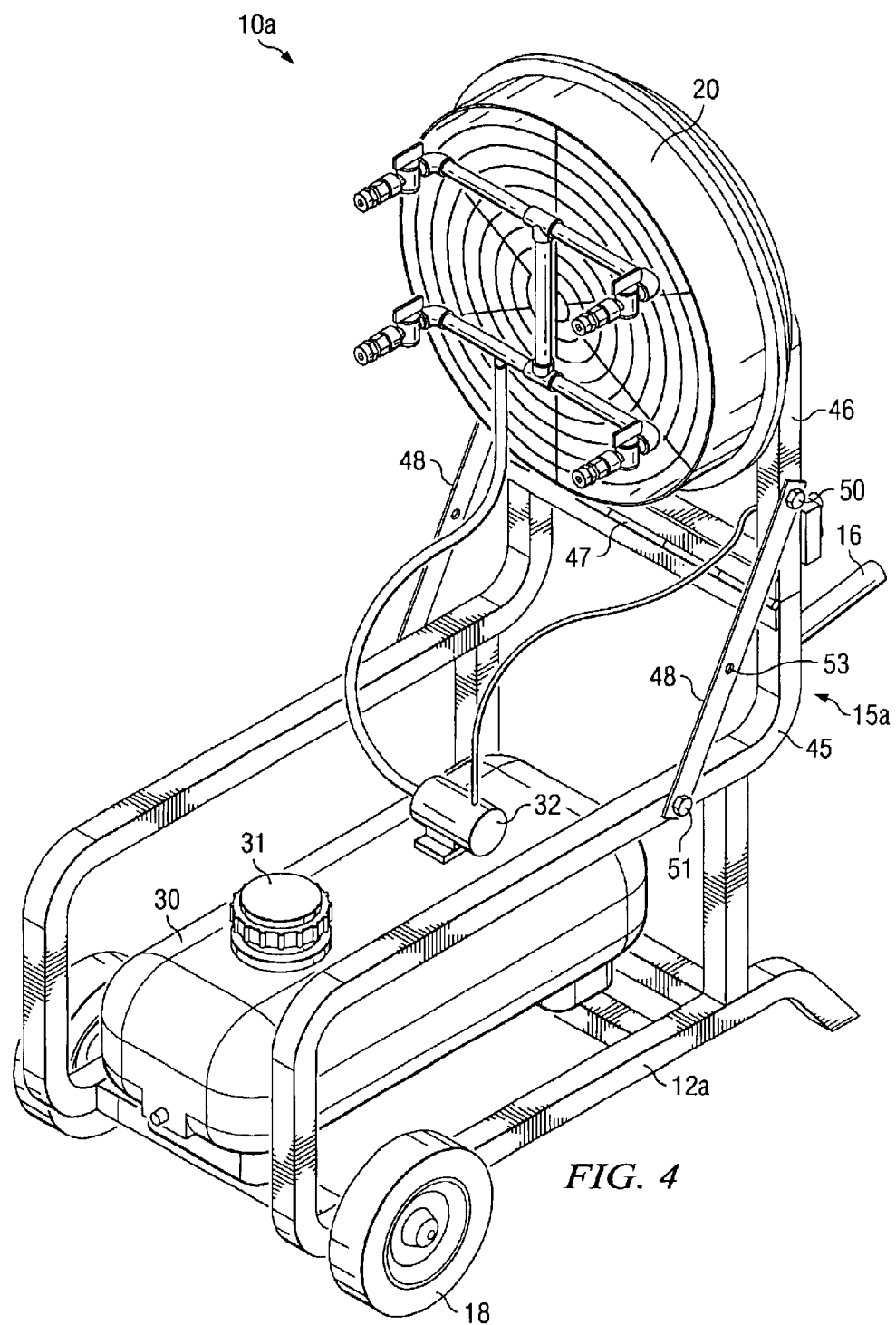
FIG. 4 is a perspective view of a fold-down modification of the cooling unit of the present invention with the unit in its operable position.
Figure 5:
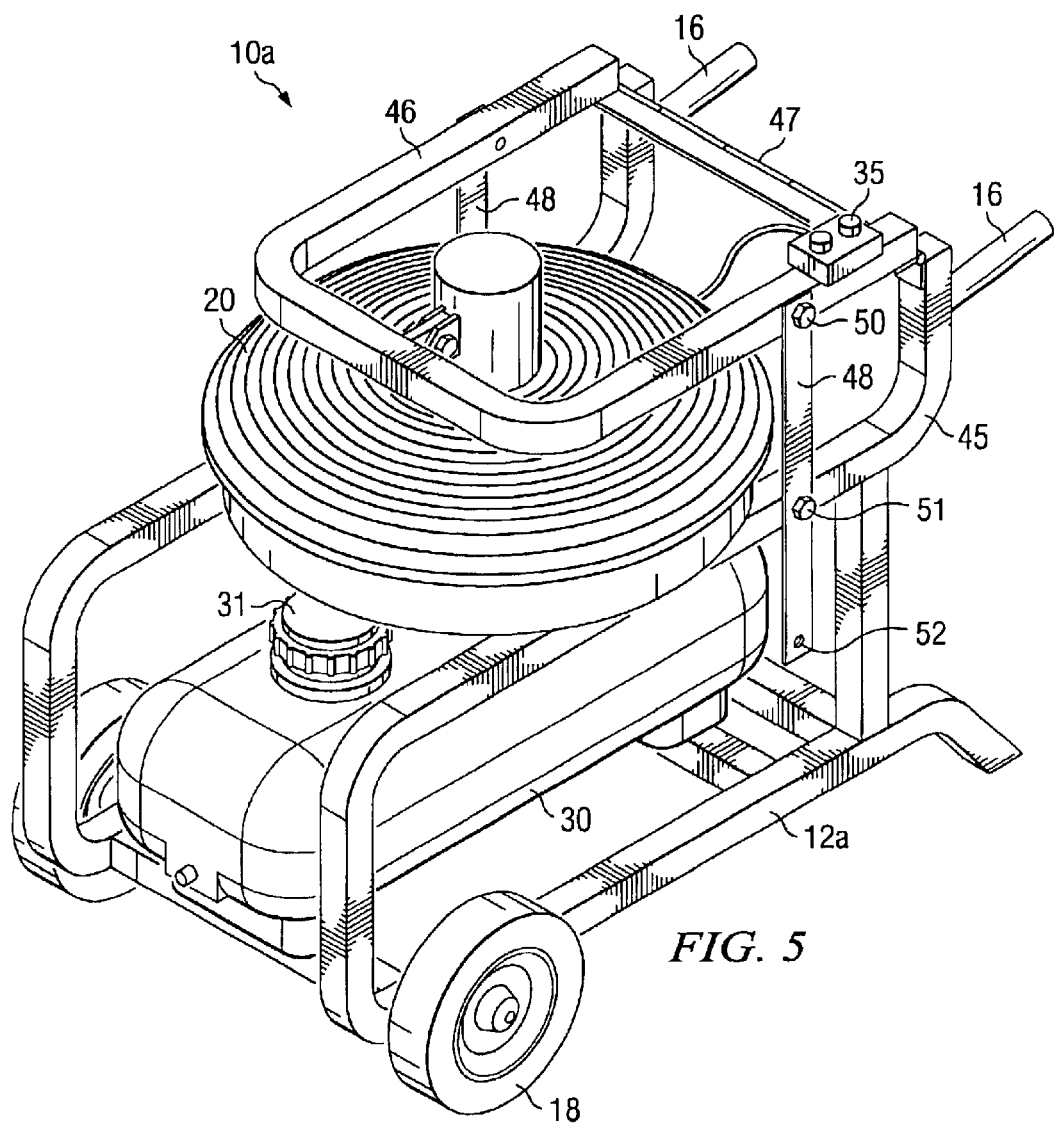
FIG. 5 is a perspective view, similar to FIG. 4, with said fold-down unit in its stored position.

FIGS. 4 and 5 illustrate a "fold-down" embodiment of the present invention. Basically, mister 10a has basically the same components as the mister 10, described above. The primary difference is that the vertical support 15a is comprised of a lower or first section 45 which is connected to or forms an integral part of horizontal platform 12a and an upper or second section 46 on which fan 20a is mounted. The two sections are pivotably connected together by a hinge 47 or the like so that the second section 46 can fold forward and down relative to the horizontal platform 12a (FIG. 5) for transportation and/or storage.

To secure unit 10a in its upright, operable position (FIG. 4), braces 48 are connected (a) at one end to second section 46 by bolts 50 or the like and (b) at their respective other ends to the first section 45 by bolts 51 or the like through holes 52 (FIG. 5) in braces 48. When unit 10a is to be transported and/or stored (FIG. 5), bolts 51 are removed and repositioned in holes 53 (FIG. 4) to secure the unit in its folded position.

Figure 6:
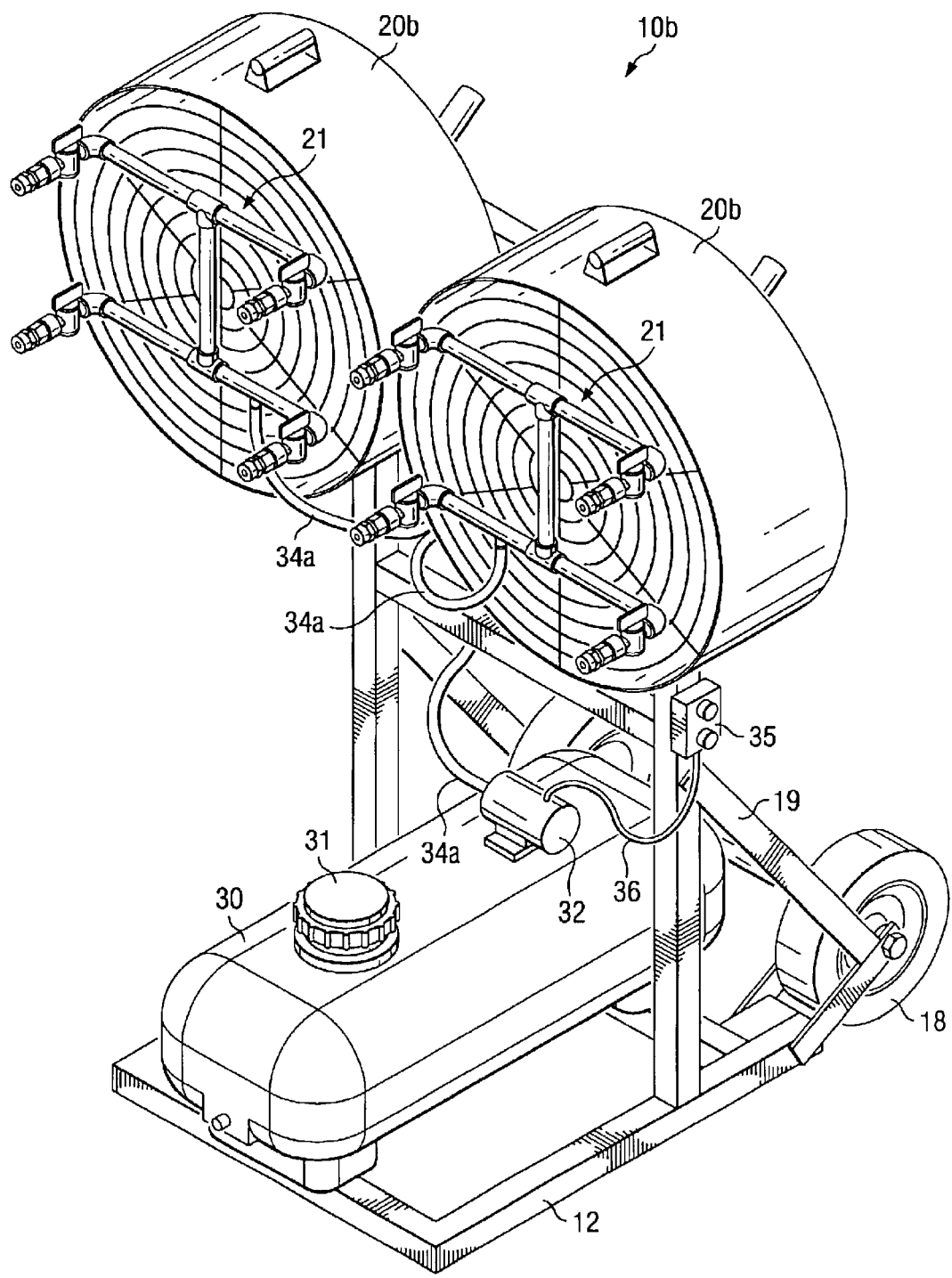
FIG. 6 is a perspective, front view of still another embodiment of the cooling unit of the present invention having dual fans.

FIG. 6 discloses a still further modification of the present invention. Portable mister unit 10b is basically the same as that disclosed in FIGS. 1 and 2 except that it includes two fans 20b mounted on vertical support 15. Each fan 20b has a mister head 21, such described above, mounted thereon. A common pump 32 pumps water from common tank 30 to each mister head 21 through supply conduits 34a. By using two fans, the cooling capacity of unit 10b is effectively doubled without requiring an addition tank 30 or pump 32.

What is claimed is:

1. A portable mister unit comprising:
    a frame;
    wheels mounted on said frame for allowing said frame to be easily moved about;
    an electrically-driven fan mounted on said frame;
    a mister head mounted on the front of said fan whereby said mister head lies within the air flow from the fan when said fan is operating; said mister head comprising:
        an H-shaped support comprised of two elongated conduits joined with a cross conduit to form a continuous fluid passageway therethrough;
        a spray nozzle mounted on each end of each of said two elongated conduits by a rotatable connection;
        a valve fluidly connected between said respective ends of said elongated conduits and each respective spray nozzle to control flow through said spray nozzle;
    a storage tank mounted on said frame for movement therewith; and
    means for delivering water from said storage tank to said mister head.

2. The portable mister unit of claim 1 wherein said means for delivering water from said storage tank comprises:
    an electrically-driven pump mounted on said frame having an inlet in fluid communication with said storage tank; and
    a conduit fluidly connected between said pump and said mister head for delivering water from said storage tank to each said spray nozzle.

3. The portable mister unit of claim 2 wherein said pump is mounted on said storage tank.

4. The portable mister unit of claim 3 including means for furnishing power to both said fan and said pump from a common electrical source.

5. The portable mister unit of claim 1 wherein said frame comprises:
    a horizontal platform having said wheels mounted on the underside thereof and said storage tank mounted on the upper side thereof;
    a vertical support connected to said horizontal platform and extending upward therefrom, said fan being mounted on said vertical support; and
    a handle means mounted on the rear of said vertical support for aiding in the movement of said unit.

6. The portable unit of claim 5 including:
    a shelf mounted on the rear of said vertical support and adapted to support a gas-powered, electricity generator.

7. The portable unit of claim 5 wherein said vertical support comprises:
    a first section and a second section pivotably connected together whereby said sections can be folded towards each other, said first section being connected to said horizontal platform and said second section having said fan mounted thereon.

8. The portable unit of claim 5 including:
    a second fan mounted on vertical support, said second fan having a second mister head mounted on the front thereof.

9. A portable mister unit comprising:
    a frame comprising:
        a horizontal platform and
        a vertical support attached to said horizontal platform and extending upward therefrom;
        wheels mounted on the underside of said horizontal platform for allowing said frame to be easily moved;
    an electrically-powered fan mounted on the front of and near the upper end of said vertical support;
    a mister head mounted on the front of said fan whereby said mister head lies within the airflow from the fan when said fan is operating;
    a storage tank mounted on said horizontal platform;
    an electrically-powered pump mounted on said storage tank and having an inlet fluidly connected to the interior of said storage tank; and
    a conduit fluidly connecting the outlet of said pump to said mister head.

10. The portable mister unit of claim 9 wherein said mister head comprises:
    an H-shaped support comprised of two elongated conduits joined with a cross conduit to form a continuous fluid passageway therethrough;
    a spray nozzle mounted on each end of each of said two elongated conduits.

11. The portable mister unit of claim 10 including:
    a ball-joint for connecting each spray swivel to a respective end of said elongated conduits; and
    a valve fluidly connected between each said spray nozzle and said respective end of said elongated conduit to control glow through said spray nozzle.

12. The portable mister unit of claim 11 including means for furnishing power to both said fan and said pump from a common electrical source.

13. The portable unit of claim 12 wherein said vertical support comprises:
    a first section and a second section pivotably connected together whereby said sections can be folded towards each other, said first section being connected to said horizontal platform and said second section having said fan mounted thereon.

* * * * *